United States Patent
Koizumi

(10) Patent No.: US 9,736,359 B2
(45) Date of Patent: Aug. 15, 2017

(54) IMAGE CAPTURING APPARATUS AND CONTROL METHOD THEREFOR

(71) Applicant: CANON KABUSHIKI KAISHA, Tokyo (JP)

(72) Inventor: Risa Koizumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 14/845,036

(22) Filed: Sep. 3, 2015

(65) Prior Publication Data

US 2016/0073038 A1 Mar. 10, 2016

(30) Foreign Application Priority Data

Sep. 8, 2014 (JP) .................................. 2014-182502

(51) Int. Cl.
*H04N 5/262* (2006.01)
*H04N 5/232* (2006.01)
*H04N 5/77* (2006.01)
*H04N 5/783* (2006.01)

(52) U.S. Cl.
CPC ..... *H04N 5/23222* (2013.01); *H04N 5/23245* (2013.01); *H04N 5/772* (2013.01); *H04N 5/783* (2013.01)

(58) Field of Classification Search
CPC ...... H04N 5/262; H04N 5/2621; H04N 5/232; H04N 5/23222; H04N 5/23229; H04N 5/783; H04N 5/772
See application file for complete search history.

(56) References Cited

U.S. PATENT DOCUMENTS

| | | | | |
|---|---|---|---|---|
| 2003/0146981 A1* | 8/2003 | Bean | ................. | H04N 5/2353 348/222.1 |
| 2006/0238620 A1* | 10/2006 | Asada | ................. | H04N 5/232 348/207.99 |
| 2007/0189728 A1* | 8/2007 | Yu | ................. | H04N 5/232 386/226 |
| 2008/0063361 A1* | 3/2008 | Saito | ................. | H04N 5/445 386/219 |
| 2008/0129854 A1* | 6/2008 | Onoda | ................. | H04N 1/2145 348/295 |
| 2009/0237527 A1* | 9/2009 | Mizuno | ................. | H04N 5/772 348/231.2 |
| 2010/0079620 A1* | 4/2010 | Kuriyama | ................. | H04N 5/232 348/231.3 |
| 2010/0260472 A1* | 10/2010 | Okada | ................. | H04N 5/772 386/343 |
| 2011/0097059 A1* | 4/2011 | Sekiguchi | ................. | G11B 27/005 386/343 |

(Continued)

FOREIGN PATENT DOCUMENTS

JP 2010-251907 A 11/2010

*Primary Examiner* — Abdelaaziz Tissire
(74) *Attorney, Agent, or Firm* — Cowan, Liebowitz & Latman, P.C.

(57) ABSTRACT

There is provided an image capturing apparatus. A detection unit detects a state of a subject. A determining unit determines a shooting framerate, a frame recording ratio, and a shooting time based on the state of the subject. A shooting unit shoots a moving image at the determined shooting framerate over the determined shooting time and records the moving image in accordance with the determined recording ratio.

19 Claims, 9 Drawing Sheets

(56) References Cited

U.S. PATENT DOCUMENTS

2012/0242851 A1* 9/2012 Fintel ................. H04N 5/23222
                                                    348/221.1
2012/0327273 A1* 12/2012 Suzuki ................... H04N 5/232
                                                    348/240.1

* cited by examiner

FIG. 4

| MOTION LEVEL | SHOOTING FRAMERATE | RECORDING RATIO | SHOOTING TIME | PLAYBACK TIME |
|---|---|---|---|---|
| 1 | 30fps | 1/2 (6 SEC) | 6 SEC | 3 SEC |
| 2 | 30fps | 1 (4 SEC) | 4 SEC | 4 SEC |
| 3 | 90fps | 1/3 (1 SEC) → 1 (1 SEC) → 1/3 (1 SEC) | 3 SEC | 5 SEC |

FIG. 9

| MOTION LEVEL | SHOOTING FRAMERATE | RECORDING RATIO | SHOOTING TIME | PLAYBACK TIME |
|---|---|---|---|---|
| 1 | 30fps | 1/2 (6 SEC) | 6 SEC | 3 SEC |
| 2 | 30fps | 1 (4 SEC) | 4 SEC | 4 SEC |
| 3 | 90fps | 1/3 (1 SEC) → 1 (1 SEC) → 1/3 (1 SEC) | 3 SEC | 5 SEC |
| 3 | 90fps | 1 (3 SEC) | 3 SEC | 9 SEC |

IMAGE CAPTURING APPARATUS AND CONTROL METHOD THEREFOR

BACKGROUND OF THE INVENTION

Field of the Invention

The present invention relates to an image capturing apparatus and a control method therefor.

Description of the Related Art

With the recent advent of moving image sharing sites where moving images that have been shot are shared over the Internet, users are increasingly wanting to shoot creative and interesting moving images. Adding slow-motion and fast-forward effects to a moving image can be thought of as one method of making a moving image interesting.

The playback time of a moving image changes when a slow-motion or fast-forward effect is added to the moving image. Japanese Patent Laid-Open No. 2010-251907 is known as a technique that suppresses the playback time. According to Japanese Patent Laid-Open No. 2010-251907, the recording time of a moving image is set so that the playback time is constant even in the case where an effect such as slow-motion, fast-forward, or the like has been added to the moving image.

Although Japanese Patent Laid-Open No. 2010-251907 discloses setting the recording time (shooting time) of a moving image based on an effect (slow-motion or fast-forward) added to the moving image, no mention is made of setting the shooting time of the moving image based on a state of a subject.

SUMMARY OF THE INVENTION

Having been achieved in light of the aforementioned situation, the present invention provides a technique that controls a shooting time of a moving image based on a state of a subject.

According to a first aspect of the present invention, there is provided an image capturing apparatus comprising: a detection unit configured to detect a state of a subject; a determining unit configured to determine a shooting framerate, a frame recording ratio, and a shooting time based on the state of the subject; and a shooting unit configured to shoot a moving image at the determined shooting framerate over the determined shooting time and record the moving image in accordance with the determined recording ratio.

According to a second aspect of the present invention, there is provided an image capturing apparatus comprising: a detection unit configured to detect a state of a subject; a determining unit configured to determine a shooting framerate, a frame playback ratio, and a shooting time based on the state of the subject; and a shooting unit configured to shoot a moving image at the determined shooting framerate over the determined shooting time and record the moving image in association with the determined playback ratio.

According to a third aspect of the present invention, there is provided a control method for an image capturing apparatus, the method comprising: a detection step of detecting a state of a subject; a determining step of determining a shooting framerate, a frame recording ratio, and a shooting time based on the state of the subject; and a shooting step of shooting a moving image at the determined shooting framerate over the determined shooting time and recording the moving image in accordance with the determined recording ratio.

According to a fourth aspect of the present invention, there is provided a control method for an image capturing apparatus, the method comprising: a detection step of detecting a state of a subject; a determining step of determining a shooting framerate, a frame playback ratio, and a shooting time based on the state of the subject; and a shooting step of shooting a moving image at the determined shooting framerate over the determined shooting time and recording the moving image in association with the determined playback ratio.

According to a fifth aspect of the present invention, there is provided a non-transitory computer-readable storage medium which stores a program for causing a computer to execute a control method comprising: a detection step of detecting a state of a subject; a determining step of determining a shooting framerate, a frame recording ratio, and a shooting time based on the state of the subject; and a shooting step of shooting a moving image at the determined shooting framerate over the determined shooting time and recording the moving image in accordance with the determined recording ratio.

According to a sixth aspect of the present invention, there is provided a non-transitory computer-readable storage medium which stores a program for causing a computer to execute a control method comprising: a detection step of detecting a state of a subject; a determining step of determining a shooting framerate, a frame playback ratio, and a shooting time based on the state of the subject; and a shooting step of shooting a moving image at the determined shooting framerate over the determined shooting time and recording the moving image in association with the determined playback ratio.

Further features of the present invention will become apparent from the following description of exemplary embodiments with reference to the attached drawings.

BRIEF DESCRIPTION OF THE DRAWINGS

FIG. 4 is a diagram illustrating an effect determination table.

FIG. 9 is a diagram illustrating an effect determination table.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
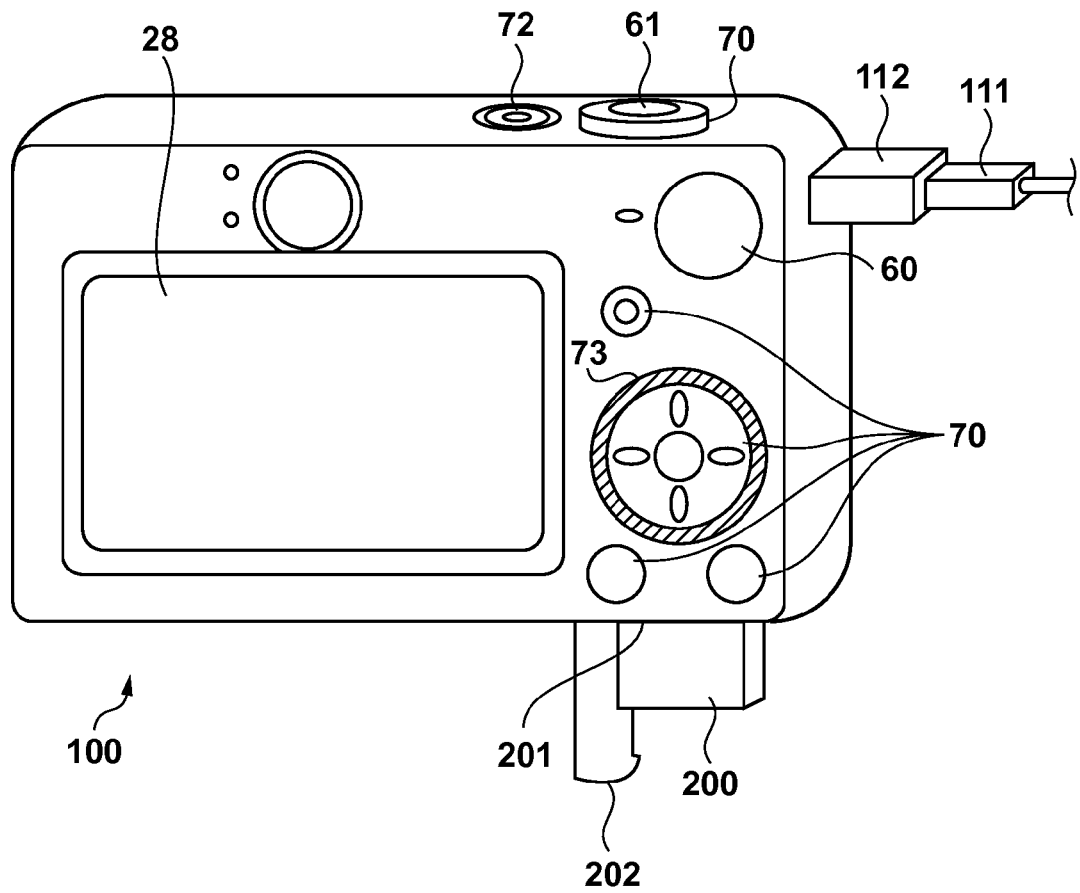
FIG. 1 is an external view of an image capturing apparatus 100.

FIG. 1 is an external view of an image capturing apparatus 100 according to a first embodiment. In FIG. 1, a display unit 28 displays images, various types of information, and so on. A shutter button 61 is an operation unit for making a shooting instruction. A mode change switch 60 is an operation unit for switching among various types of modes. A connector 112 connects a connection cable 111 and the image capturing apparatus 100. An operation unit 70 is constituted by operation members such as various types of switches, buttons, a touch panel, and so on that accept various types of operations from a user. A controller wheel 73 is an operation member, included in the operation unit 70, that can be rotationally manipulated. A power switch 72 is an operation unit for switching the power on and off. A recording medium 200 is a recording medium such as a memory card, a hard disk, or the like. A recording medium slot 201 is a slot for holding the recording medium 200. The recording medium 200 held in the recording medium slot 201 can communicate with the image capturing apparatus 100.

Figure 2:
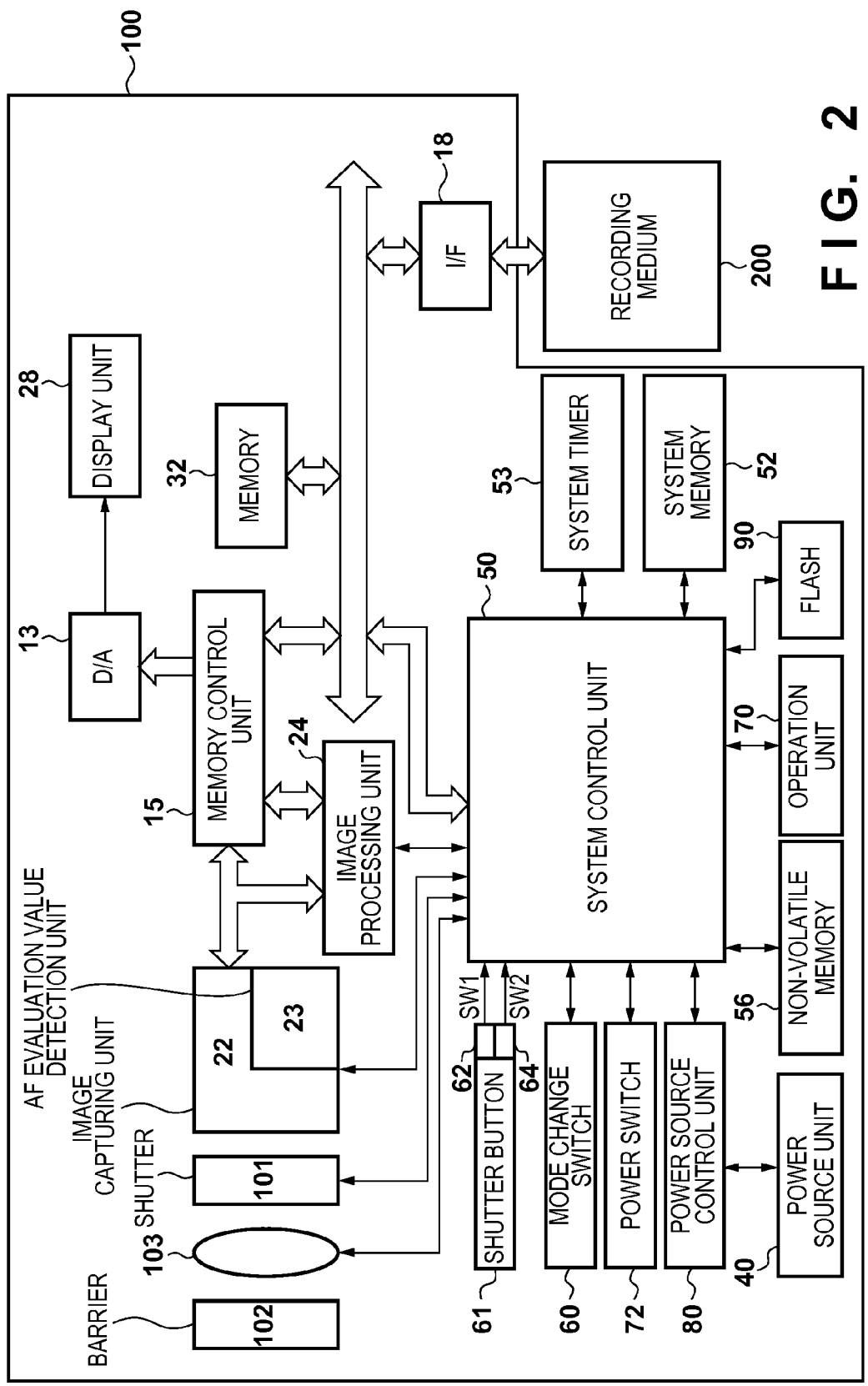
FIG. 2 is a functional block diagram of the image capturing apparatus 100.

FIG. 2 is a functional block diagram of the image capturing apparatus 100. In FIG. 2, a shutter 101 is a shutter having an aperture function. A shooting lens 103 corresponds to a lens group including a zoom lens and a focus lens. An image capturing unit 22 is an image sensor constituted by a CCD, a CMOS element, or the like that converts an optical image into an electrical signal. The image capturing unit 22 includes an A/D conversion processing function. An AF evaluation value detection unit 23 calculates an AF (autofocus) evaluation value from contrast information and the like obtained from a digital image signal, and the obtained AF evaluation value is output from the image capturing unit 22 to a system control unit 50. A barrier 102 prevents an imaging system including the shooting lens 103, the shutter 101, and the image capturing unit 22 from being soiled or damaged by covering the imaging system. A flash 90 adds illumination light when shooting low-light scenes, backlit scenes, or the like by emitting light during the shooting.

An image processing unit 24 carries out predetermined pixel interpolation, resizing processes for reducing the size of an image and the like, color conversion processing, and so on on image data output from the image capturing unit 22 or image data from a memory control unit 15. The image processing unit 24 also performs predetermined computational processing using captured image data, and the system control unit 50 performs exposure control and focus control based on results obtained from these computations. A TTL (through-the-lens) AE (automatic exposure) process and an EF (automatic flash adjustment) process are implemented thereby. The image processing unit 24 also carries out an AF (autofocus) process, but at this time, the output from the AF evaluation value detection unit 23 in the image capturing unit 22 is also sometimes used. The image processing unit 24 also performs predetermined computations using the captured image data, performing a TTL AWB (auto white balance) process based on the results thereof.

Data output from the image capturing unit 22 is written directly into a memory 32 via the image processing unit 24 and the memory control unit 15, or via the memory control unit 15. The memory 32 stores the image data obtained by the image capturing unit 22 and subjected to A/D conversion, image data for display in the display unit 28, and the like. The memory 32 is provided with a storage capacity sufficient to store a predetermined number of still images, a predetermined time's worth of moving images and audio, and so on. The memory 32 also functions as an image display memory (a video memory).

A D/A converter 13 converts data for image display, stored in the memory 32, into an analog signal and supplies the analog signal to the display unit 28. In this manner, image data for display written into the memory 32 is displayed by the display unit 28 via the D/A converter 13. The display unit 28 carries out a display in a display device, which is an LCD or the like, based on the analog signal from the D/A converter 13. By using the D/A converter 13 to convert the digital signals A/D converted by the image capturing unit 22 and stored in the memory 32 into analog signals and then sequentially transferring and displaying those signals to the display unit 28, the display unit 28 functions as an electronic viewfinder and displays a through-the-lens image.

A non-volatile memory 56 is a memory that can be recorded to and erased electrically, and is constituted by, for example, a flash memory. Operational constants, programs, and so on of the system control unit 50 are stored in the non-volatile memory 56. Here, "programs" refers to programs for executing the various flowcharts according to the present embodiment, which will be described later.

The system control unit 50 controls the image capturing apparatus 100 as a whole. The system control unit 50 implements the respective processes according to the present embodiment, mentioned later, by executing programs recorded in the non-volatile memory 56 mentioned above. The system control unit 50 also carries out display control by controlling the memory 32, the D/A converter 13, the display unit 28, and so on. A system memory 52 is a RAM. Operational constants and variables of the system control unit 50, programs read out from the non-volatile memory 56, and so on are loaded into the system memory 52. A system timer 53 measures times used in various types of control, measures the time of an internal clock, and so on.

The mode change switch 60, a first shutter switch 62, a second shutter switch 64, and the operation unit 70 are operation members for inputting various types of operating instructions to the system control unit 50. The mode change switch 60 switches an operating mode of the system control unit 50 among a still image shooting mode, a moving image shooting mode, a playback mode, and so on. "Still image shooting mode" includes an auto shooting mode, an auto scene judgment mode, a manual mode, various types of scene modes having shooting settings for each type of shot scene, a program AE mode, a custom mode, and so on. The mode change switch 60 can switch the operating mode directly to one of these modes included in the still image shooting mode. Alternatively, the mode switch may be carried out by first switching to the still image shooting mode using the mode change switch 60 and them using another operation member to switch to one of the modes included in the still image shooting mode. Likewise, the moving image shooting mode may also include a plurality of modes. The first shutter switch 62 switches on partway through the manipulation of the shutter button 61 provided in the image capturing apparatus 100, or in other words, when the button is depressed halfway (a shooting preparation instruction), and produces a first shutter switch signal SW1. The system control unit 50 commences operations such as AF (autofocus) processes, AE (automatic exposure) processes, AWB (auto white balance) processes, and EF (automatic flash adjustment) processes in response to the first shutter switch signal SW1. The second shutter switch 64 turns on when the shutter button 61 is completely manipulated, or in other words, is fully depressed (a shooting instruction), and produces a second shutter switch signal SW2. The system control unit 50 commences a series of shooting processes, from reading out signals from the image capturing unit 22 to writing image data into the recording medium 200, in response to the second shutter switch signal SW2.

Functions relevant for different situations are assigned to the operation members in the operation unit 70, which then act as various types of function buttons, by making an operation for selecting various types of function icons displayed in the display unit 28. An end button, a return button, a next image button, a jump button, a sort button, an attribute change button, and so on are examples of the function buttons. For example, a menu screen in which various types of settings can be made is displayed in the display unit 28 when a menu button is pressed. A user can make various types of settings intuitively using the menu screen displayed in the display unit 28, four directional (up, down, left, and right) buttons, a set button, and so on.

The controller wheel 73 illustrated in FIG. 1 is an operation member, included in the operation unit 70, that can be rotationally manipulated, and is used along with the directional buttons when specifying items to be selected and so on. When the controller wheel 73 is rotationally manipulated, an electrical pulse signal is produced in accordance with the operational amount, and the system control unit 50 controls the respective units in the image capturing apparatus 100 based on that pulse signal. An angle to which the controller wheel 73 has been rotationally manipulated, a number of revolutions, and so on can be determined based on this pulse signal. Note that the controller wheel 73 may be any kind of operation member as long as the member is capable of detecting rotational manipulation. For example, the controller wheel 73 may be a dial-type operation member that produces a pulse signal upon the controller wheel 73 itself rotating in accordance with a rotational manipulation made by a user. Alternatively, the controller wheel 73 may be an operation member constituted by a touch sensor, with the controller wheel 73 detecting rotational motion of a user's finger on the controller wheel 73 rather than the controller wheel 73 itself rotating (a so-called "touch wheel").

A power control unit 80 is constituted by a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200.

A power source unit 40 is a primary battery such as an alkali battery, a lithium battery, or the like, a secondary battery such as a NiCd battery, a NiMH battery, a Li battery, or the like, an AC adapter, and so on. A recording medium I/F 18 is an interface for the recording medium 200 such as a memory card, a hard disk, or the like. The recording medium 200 is a recording medium for recording shot images, such as a memory card or the like, and is constituted by a semiconductor memory, a magnetic disk, or the like.

In the present embodiment, the image capturing apparatus 100 is assumed to operate in a shooting mode that links a plurality of pieces of moving image data, obtained by shooting moving images a plurality of times, into a single piece of joined moving image data (called a "joined moving image shooting mode"). In addition, by controlling a framerate when shooting a moving image (a shooting framerate), a recording ratio of frames when recording a moving image, and so on, the image capturing apparatus 100 can add a special effect, such as a slow-motion playback effect or a fast-forward playback effect, to individual pieces of moving image data to be linked.

Figure 3:
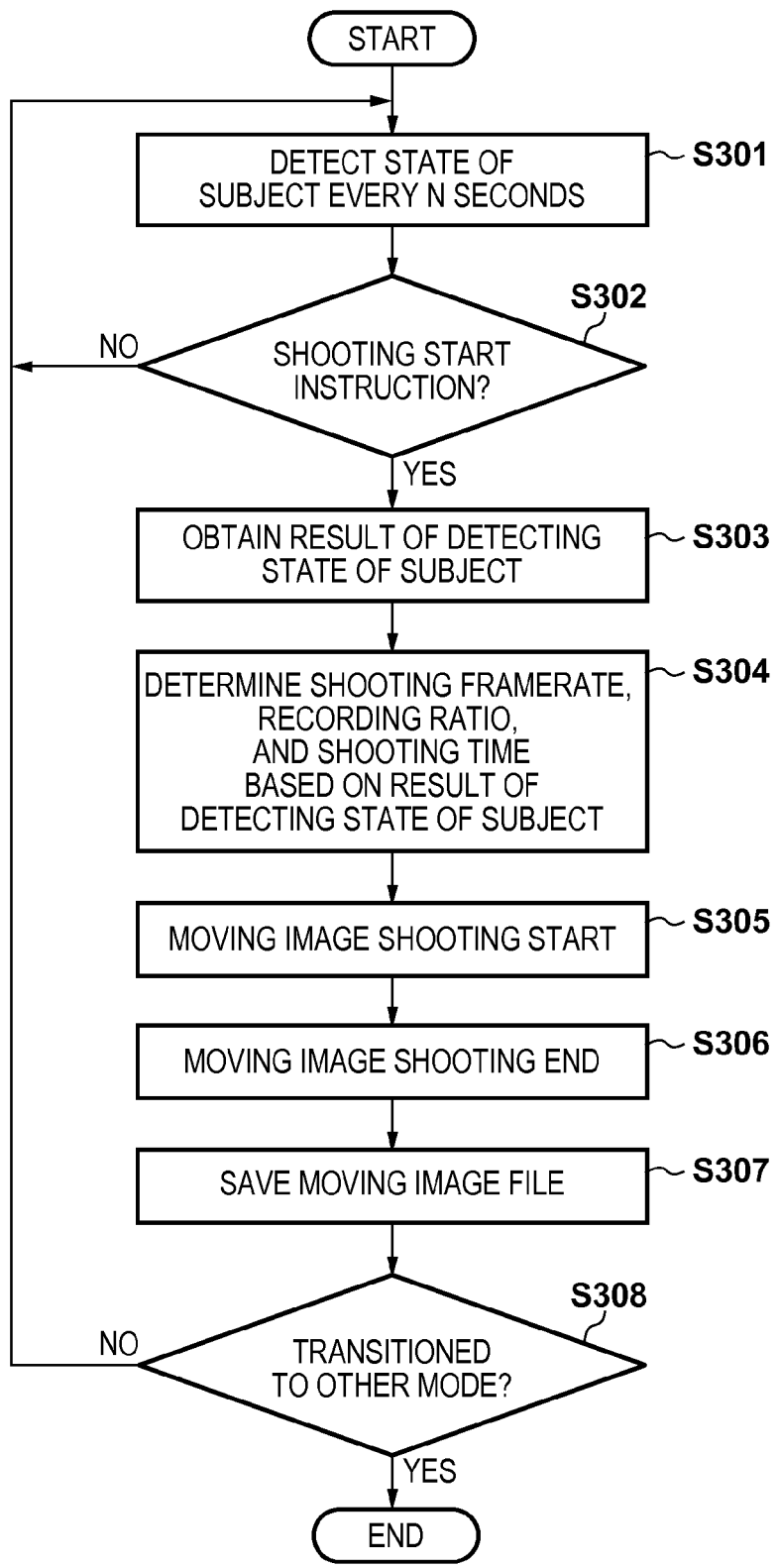
FIG. 3 is a flowchart illustrating a moving image shooting process executed by the image capturing apparatus 100.

FIG. 3 is a flowchart illustrating a moving image shooting process executed by the image capturing apparatus 100. Unless otherwise specified, the processes in each step of this flowchart are realized by the system control unit 50 executing programs recorded in the non-volatile memory 56. The processing illustrated in this flowchart starts when the operating mode of the image capturing apparatus 100 transitions to the stated joined moving image shooting mode.

In step S301, the image capturing apparatus 100 detects a state of a subject every N seconds. For example, the image capturing apparatus 100 can obtain an amount of change in a center position of a primary subject region between frames based on the signal data output from the image capturing unit 22 and detect a change in the state of the subject from that amount of change. An algorithm that determines whether or not a primary subject is present in a screen based on luminance or color area distribution, edge information, and the like in the screen is generally known for detecting a primary subject. The purpose of detecting the state of the subject in step S301 is to add a special effect, such as the slow-motion playback effect or the fast-forward playback effect, to individual pieces of moving image data to be linked, as mentioned above. A method for selecting the special effect will be described in greater detail later.

In step S302, the image capturing apparatus 100 determines whether or not an instruction to start shooting has been made by the user. The process of step S301 is repeated until the instruction to start shooting is made. The processing advances to step S303 when the instruction to start shooting is made (that is, when the system control unit 50 receives the instruction to start shooting). In step S303, the image capturing apparatus 100 obtains a result of detecting the state of the subject in step S301.

In step S304, the image capturing apparatus 100 determines the shooting framerate, the recording ratio, and the shooting time based on the result of detecting the state of the subject. In the present embodiment, it is assumed that the determination process of step S304 is carried out in accordance with an effect determination table, illustrated in FIG. 4. The effect determination table is a table for determining the slow-motion playback effect, the fast-forward playback effect, or the like mentioned earlier, in accordance with the state of the subject.

The determination process of step S304 will be described in further detail with reference to FIGS. 4 to 6. The present embodiment assumes that a motion level of the subject, which corresponds to a result of detecting the state of the subject, is used, and that a higher numerical value for the motion level indicates a higher level of motion in the subject.

Figure 5:
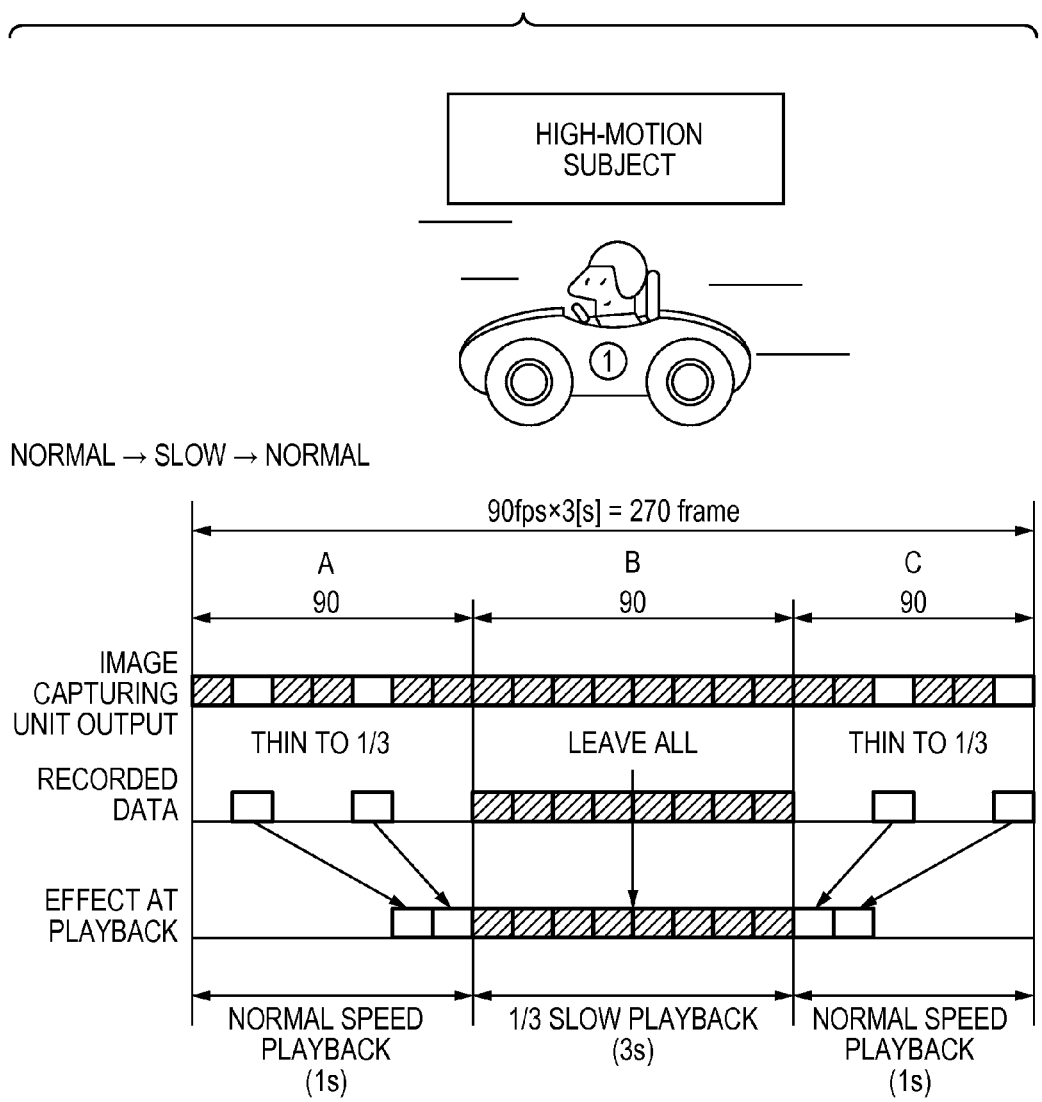
FIG. 5 is a diagram illustrating a shooting process in the case where a motion level is 3 (the case where there is high subject motion).

FIG. 5 is a diagram illustrating a shooting process in the case where the motion level is 3 (the case where there is high subject motion). FIG. 5 illustrates 270 frames output from the image capturing unit 22 (that is, 90 fps×3 seconds), a playback framerate of 30 fps, with 90 frames at the start and end being thinned to ⅓. In this case, a moving image to which an effect of normal playback (1 second)→slow-motion playback (3 seconds)→normal playback (1 second) has been added is generated. In this case, the image capturing apparatus 100 determines the shooting framerate to 90 fps and the shooting time to 3 seconds, in accordance with the effect determination table illustrated in FIG. 4. Furthermore, the image capturing apparatus 100 determines the recording ratio so that of the 3-second shooting time, the recording ratio is ⅓ in the first 1 second, the recording ratio is 1 in the next 1 second, and the recording ratio is ⅓ in the final 1 second. In this manner, the recording ratio need not be constant throughout the entire shooting time, and may change partway therethrough. A moving image to which the effect indicated in FIG. 5 has been added is generated as a result. To rephrase, determining the shooting framerate and the recording ratio in step S304 corresponds to determining the special effect to be added to the moving image. Furthermore, determining the shooting framerate, the recording ratio, and the shooting time also determines the playback time.

Figure 6:
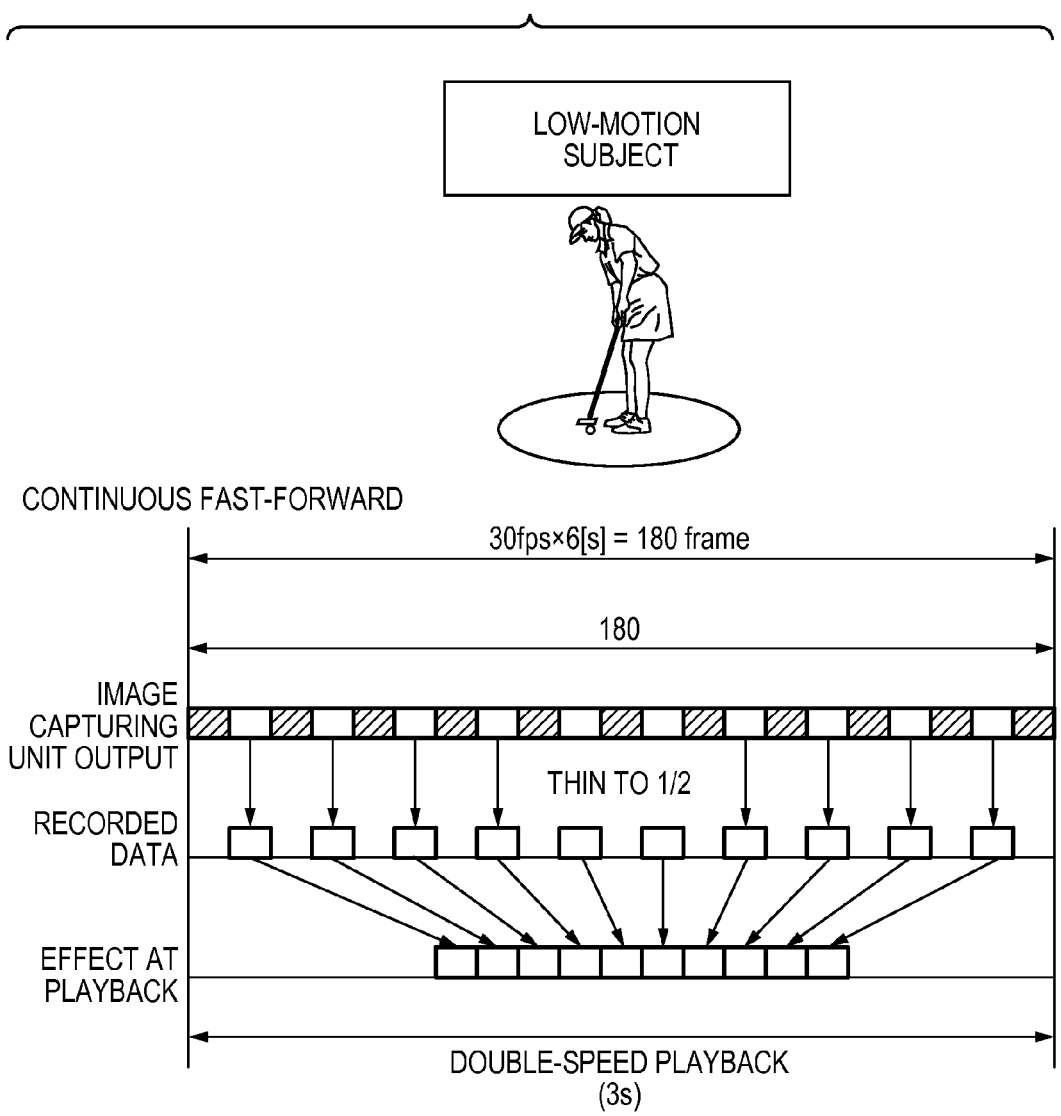
FIG. 6 is a diagram illustrating a shooting process in the case where a motion level is 1 (the case where there is low subject motion).

FIG. 6 is a diagram illustrating the shooting process in the case where the motion level is 1 (the case where there is low subject motion). FIG. 6 illustrates 180 frames output from the image capturing unit 22 (that is, 30 fps×6 seconds), a playback framerate of 30 fps, with all frames being thinned to ½. A moving image to which an effect of double-speed playback (3 seconds) has been added is generated in this case. Like the case illustrated in FIG. 5, the image capturing apparatus 100 determines the shooting framerate, the recording ratio, and the shooting time in accordance with the effect determination table illustrated in FIG. 4.

As can be seen from FIG. 4, in the present embodiment, the playback time of the moving image changes depending on the motion level, but the special effect table is configured so that the playback time falls within a predetermined range (3 seconds to 5 seconds, for example). In other words, the image capturing apparatus 100 determines the shooting framerate, the recording ratio, and the shooting time so that the playback time of the moving image falls within the predetermined range. As a result, fluctuations in the playback time can be suppressed even in the case where the slow-motion playback effect, the fast-forward playback effect, or the like is added to the moving image based on motion in the subject.

Meanwhile, the special effects added to the moving image are not limited to those indicated in FIGS. 5 and 6. For example, in the case where the subject motion is low (the case where a degree of motion is less than a first threshold), the image capturing apparatus 100 determines the shooting framerate and the recording ratio so that at least part of the recorded moving image undergoes fast-forward playback during playback. As another example, in the case where the subject motion is high (the case where the degree of motion is greater than or equal to a second threshold), the image capturing apparatus 100 determines the shooting framerate and the recording ratio so that at least part of the recorded moving image undergoes slow-motion playback during playback.

Next, in step S305, the image capturing apparatus 100 starts shooting the moving image. Specifically, the image capturing apparatus 100 shoots the moving image at the shooting framerate determined in step S304 over the shooting time determined in step S304. In addition, when recording the shot moving image, the image capturing apparatus 100 records the frames based on the recording ratio determined in step S304. The moving image shooting ends automatically in step S306 when the determined shooting time has elapsed.

Figure 7:
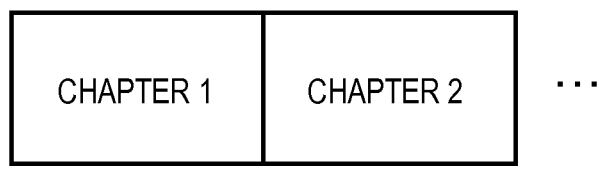
FIG. 7 is a conceptual diagram of a joined moving image.

In S307, the image capturing apparatus 100 saves the shot moving image as a moving image file. As illustrated in FIG. 7, in the case where there are one or more moving images (chapters) already shot in the joined moving image shooting mode, the image capturing apparatus 100 links the current moving image that has been newly shot with the moving images shot previously. In the example illustrated in FIG. 7, two moving images have already been created and linked together as chapters 1 and 2. Accordingly, the current moving image that has been newly shot will be linked after chapter 2, as chapter 3. As a result, the three chapters are recorded as a single joined moving image. A new moving image file is generated in the case where there are no moving images shot previously.

In step S308, the image capturing apparatus 100 determines whether or not the operating mode has transitioned to another mode. The processing returns to step S301 in the case where the operating mode has not transitioned to another mode. In this case, the next moving image shot is linked to the moving image shot previously in step S305 and recorded. The processing of the flowchart ends in the case where the operating mode has transitioned to another mode.

Incidentally, as illustrated in FIG. 4, the playback time of the moving image differs depending on the motion level of the subject, and thus the playback time of the joined moving image may fluctuate greatly in the case where a plurality of moving images are linked together. For example, in the case where four moving images are linked together, the playback time of the joined moving image fluctuates between 12 seconds (3 seconds×4 moving images) and 20 seconds (5 seconds×4 moving images). Accordingly, to suppress such fluctuations in the playback time of the joined moving image, the image capturing apparatus 100 may take into consideration the playback time of the moving images shot previously in addition to the motion level of the subject when determining the shooting framerate and so on in step S304. To rephrase, in the case where a new moving image is shot after shooting one or more moving images, the image capturing apparatus 100 may take into consideration the playback time of the one or more moving images shot previously. A specific example of this will be described with reference to FIGS. 8A, 8B, and 9.

Figure 8A:
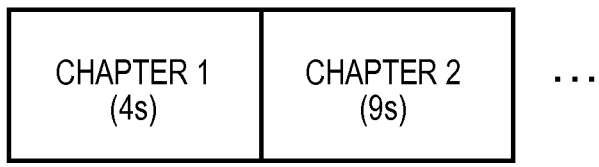
FIGS. 8A and 8B are conceptual diagrams of a joined moving image constituted by a plurality of moving images having different playback times.
Figure 8B:
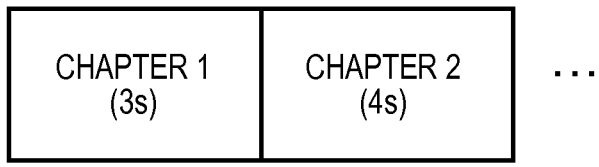

FIGS. 8A and 8B illustrate moving image data shot previously in the joined moving image shooting mode and linked, and FIG. 9 illustrates an effect determination table. The effect determination table illustrated in FIG. 9 differs from the effect determination table illustrated in FIG. 4 in that there are two rows corresponding to a motion level of 3, and the rows have mutually different playback times of 5 seconds and 9 seconds, respectively. Although not illustrated, motion levels of 1 and 2 may also have a plurality of rows. In FIG. 9, the longest playback time is 9 seconds and the shortest playback time is 3 seconds.

Here, in the case where the motion level is 3, the image capturing apparatus 100 determines which row in the effect determination table to use based on the playback time of the moving images shot previously. For example, in the case where the moving images shot previously include a moving image having the longest playback time (that is, 9 seconds) as indicated in FIG. 8A, the image capturing apparatus 100 uses the row having the playback time of 5 seconds. Conversely, in the case where the moving images shot previously include a moving image having the shortest playback time (that is, 3 seconds) as indicated in FIG. 8B, the image capturing apparatus 100 uses the row having the playback time of 9 seconds. In other cases, the image capturing apparatus 100 selects the row having the playback time of 5 seconds or the row having the playback time of 9 seconds at random. Meanwhile, in the case where priority is placed on suppressing fluctuations in the playback time, the image capturing apparatus 100 may select a different row from the row that corresponds to the actual motion level of the subject. For example, in the state illustrated in FIG. 8B, the motion level in the row whose playback time is 4 seconds is 2 rather than 1, but the image capturing apparatus 100 may select that row in the case where the motion level of the subject is 1. Note that when selecting a row in the effect determination table, the image capturing apparatus 100 may take into consideration the playback times of all moving images shot previously, or may take into consideration the playback times of only some of the moving images (the moving image show immediately before, for example).

The image capturing apparatus 100 may also carry out processes such as to set a limit on the number of files to be linked, to switch to a new moving image file when the playback time exceeds a certain amount of time, or the like in order to generate a joined moving image having the optimal playback time.

As is clear from FIG. 9, in the present embodiment, the playback time is not determined uniquely based on the shooting framerate. Even when the shooting framerate is the same 30 fps, the playback time may be 3 seconds in some cases and 4 seconds in other cases. Likewise, even when the shooting framerate is the same 90 fps, the playback time may be 5 seconds in some cases and 9 seconds in other cases. The reason for the playback time not being determined uniquely based on the shooting framerate is that a thinning process for adding a special effect such as the slow-motion playback effect or the fast-forward playback effect to the moving image is carried out based on the result of detecting the state of the subject, as described earlier.

Incidentally, in the present embodiment, the shooting time may change with each instance of shooting in the case of shooting in the joined moving image shooting mode. Accordingly, a configuration for ensuring a user does not concentrate on such a change in the shooting time will be described.

Upon receiving the instruction to start shooting, the image capturing apparatus 100 displays, in the display unit 28, a gauge for notifying the user that a moving image is being shot. This gauge is normally displayed for the same amount of time as the shooting time. However, in the case where the shooting time determined in step S304 of FIG. 3 is less than a threshold time, the image capturing apparatus 100 continues to display the gauge for the threshold time regardless of whether or not a moving image is actually being shot. The threshold time is the longest shooting time in the effect determination table, for example.

Figure 10:
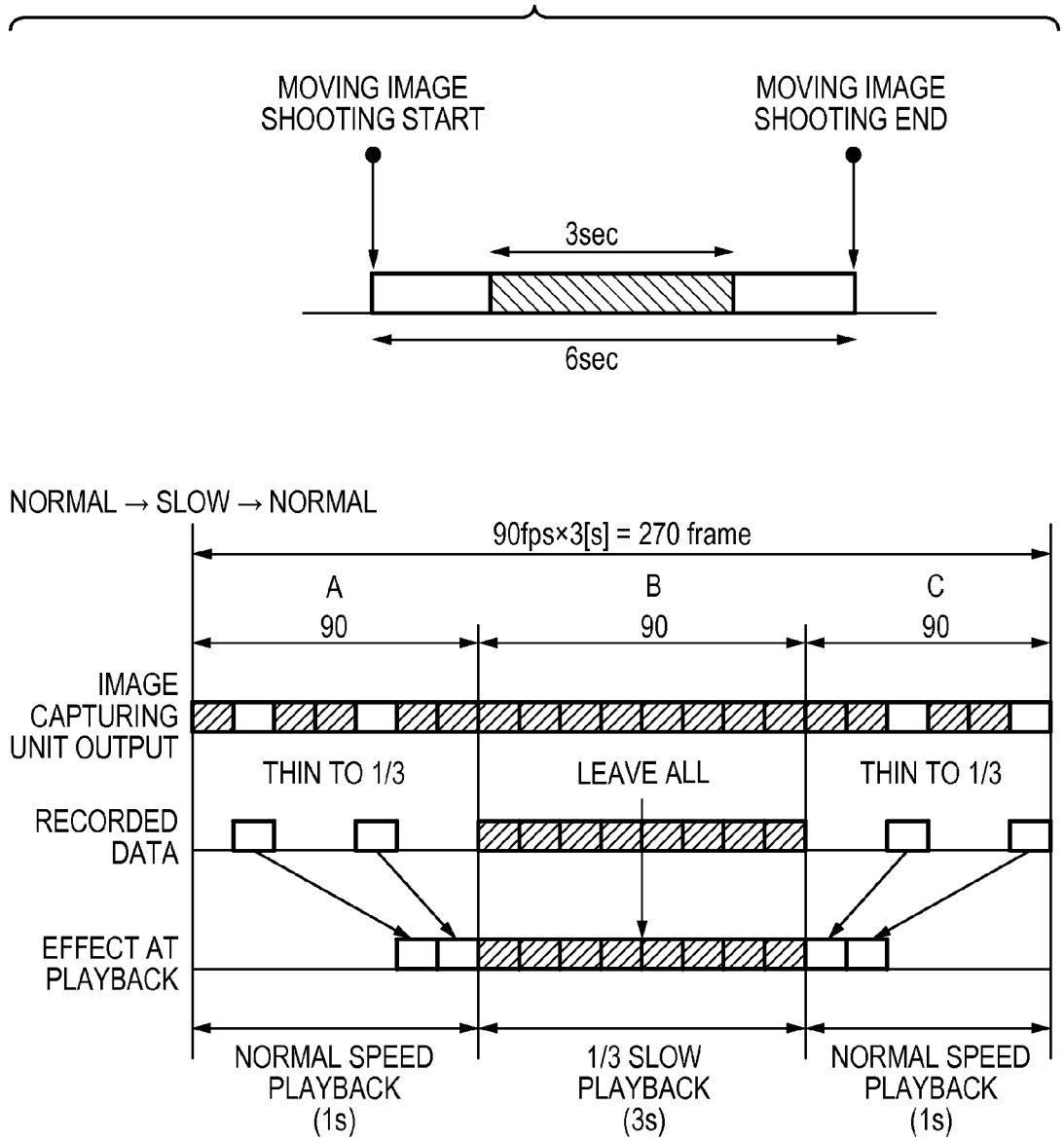
FIG. 10 is a diagram illustrating a user being notified that a moving image is being shot.

FIG. 10 illustrates a case where the row for the motion level of 3 has been selected in the effect determination table illustrated in FIG. 4. In this case, although the shooting time is 3 seconds, the longest shooting time in the effect determination table is 6 seconds, and thus the gauge is displayed for 6 seconds. The image capturing apparatus 100 shoots the moving image for a predetermined period (a second period) that falls within the period for which the gauge is displayed (a first period). The length of the predetermined period may be a length corresponding to the shooting time determined based on the effect determination table, or may be longer. For example, the predetermined period may exactly match the period for which the gauge is displayed. In the case where the predetermined period is longer than the determined shooting time, the image capturing apparatus 100 records only a predetermined part of the shot moving image that corresponds to the determined shooting time (3 seconds, in the example illustrated in FIG. 10). This predetermined part can be determined based on a change in the state of the subject within the shot moving image. For example, the image capturing apparatus 100 records a part of the shot moving image that corresponds to 3 seconds having the greatest amount of change in the state of the subject.

By showing the moving image shooting time as constant in this manner, it is possible to avoid confusing the user due to the moving image shooting times being different. It is furthermore possible to generate an effective moving image file without causing the user to concentrate on what kind of effect is being added from the shooting to when the moving image file is generated.

As described thus far, according to the first embodiment, the image capturing apparatus 100 determines the shooting framerate, the recording ratio, and the shooting time based on the state of the subject. Accordingly, the image capturing apparatus 100 can add a special effect such as slow-motion playback effect to a moving image based on the state of the subject and control the playback time of the moving image.

Incidentally, the foregoing describes that the image capturing apparatus 100 adds a special effect such as slow-motion playback effect or fast-forward playback effect to a moving image by determining (controlling) the shooting framerate and the recording ratio. However, the image capturing apparatus 100 may add a special effect to the moving image by determining a playback ratio rather than the recording ratio. In this case, the image capturing apparatus 100 records a moving image in association with the determined playback ratio. As an example of this association, the image capturing apparatus 100 may record the playback ratio in a specific header of the moving image file. To give a specific example with reference to FIG. 6, the image capturing apparatus 100 records the moving image file by shooting 180 frames of a moving image (30 fps×6 seconds) and including information indicating a playback ratio of ½ in the header. A playback apparatus then thins the 180 frames of the moving image to ½ in accordance with the header information indicating the playback ratio of ½, and plays back the moving image (the playback framerate is assumed to be the same 30 fps as described thus far). A moving image to which an effect of double-speed playback (3 seconds) has been added is generated as a result.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-182502, filed Sep. 8, 2014, which is hereby incorporated by reference herein in its entirety.

What is claimed is:

1. An image capturing apparatus comprising:
at least one non-transitory memory device:
at least one processor;
a detection unit that detects a state of a subject;
a determining unit that determines a shooting framerate, a frame recording ratio, and a shooting time based on the state of the subject;
a shooting unit that shoots a moving image at the determined shooting framerate over the determined shooting time and that records the moving image in accordance with the determined recording ratio,
a receiving unit that receives a shooting start instruction; and
a display device that notifies a user, in response to the shooting start instruction, that moving image is being shot by the shooting unit,
wherein in a case where the shooting time determined by the determining unit is less than a threshold time, the display device continues a constant notification until the threshold time elapses regardless of whether or not a moving image is being shot by the shooting unit, and
wherein the detection unit, the determining unit, the shooting unit, and the receiving unit are implemented by the at least one processor executing at least one program recorded on the at least one non-transitory memory device.

2. The image capturing apparatus according to claim 1, wherein the determining unit determines the shooting framerate, the recording ratio, and the shooting time so that a playback time of the moving image recorded by the shooting unit falls within a predetermined range.

3. The image capturing apparatus according to claim 2, wherein in a case where a degree of motion of the subject is less than a first threshold, the determining unit determines the shooting framerate and the recording ratio so that at least part of the moving image recorded by the shooting unit undergoes fast-forward playback when played back.

4. The image capturing apparatus according to claim 2, wherein in a case where a degree of motion of the subject is greater than or equal to a second threshold, the determining unit determines the shooting framerate and the recording ratio so that at least part of the moving image recorded by the shooting unit undergoes slow-motion playback when played back.

5. The image capturing apparatus according to claim 1, wherein in a case where the shooting time determined by the determining unit is less than the threshold time, the shooting unit shoots a moving image for a second period that is contained within a first period during which the display device continues the constant notification and that is longer than the determined shooting time, and records a predetermined part of the shot moving image that corresponds to the determined shooting time.

6. The image capturing apparatus according to claim 5, wherein the shooting unit determines the predetermined part based on a change in the state of the subject within the moving image shot in the second period.

7. The image capturing apparatus according to claim 1, wherein in a case where the shooting time determined by the determining unit is less than the threshold time, the shooting unit shoots a moving image for a second period that is contained within a first period during which the display device continues the constant notification and that corresponds to the determined shooting time, and records the shot moving image.

8. The image capturing apparatus according to claim 1, wherein the determining unit determines the recording ratio so that the recording ratio changes during the determined shooting time.

9. An image capturing apparatus comprising:
at least one non-transitory memory device;
at least one processor;
a detection unit that detects a state of a subject;
a determining unit that determines a shooting framerate, a frame recording ratio, and a shooting time based on the state of the subject; and
a shooting unit that shoots a moving image at the determined shooting framerate over the determined shooting time and that records the moving image in accordance with the determined recording ratio,
wherein in a case where the shooting unit shoots a new moving image after shooting one or more moving images, the determining unit determines a shooting framerate, a recording ratio, and a shooting time for the new moving image based on a playback time of at least one of the one or more moving images in addition to the state of the subject detected by the detection unit, and
wherein the detection unit, the determining unit, and the shooting unit are implemented by the at least one processor executing at least one program recorded on the at least one non-transitory memory device.

10. The image capturing apparatus according to claim 9, wherein the determining unit determines the shooting framerate, the recording ratio, and the shooting time for the new moving image so that a playback time of the new moving image is shorter the longer the playback time of at least one of the one or more moving images is.

11. An image capturing apparatus comprising:
at least one non-transitory memory device;
at least one processor;
a detection unit that detects a state of a subject;
a determining unit that determines a shooting framerate, a frame recording ratio, and a shooting time based on the state of the subject; and
a shooting unit that shoots a moving image at the determined shooting framerate over the determined shooting time and that records the moving image in accordance with the determined recording ratio,
wherein the shooting unit records a plurality of moving images including the one or more moving images and the new moving image as a single joined moving image, wherein the determining unit determines the shooting framerate, the recording ratio, and the shooting time so that a playback time of each of the plurality of the moving image recorded by the shooting unit falls within a predetermined range, and wherein the detection unit, the determining unit, and the shooting unit are implemented by the at least one processor executing at least one program recorded on the at least one non-transitory memory device.

12. The image capturing apparatus according to claim 11, wherein in a case where a degree of motion of the subject is less than a first threshold, the determining unit determines the shooting framerate and the recording ratio so that at least part of the moving image recorded by the shooting unit undergoes fast-forward playback when played back.

13. The image capturing apparatus according to claim 11, wherein in a case where a degree of motion of the subject is greater than or equal to a second threshold, the determining unit determines the shooting framerate and the recording ratio so that at least part of the moving image recorded by the shooting unit undergoes slow-motion playback when played back.

14. A control method for an image capturing apparatus, the method comprising:

detecting a state of a subject;

determining a shooting framerate, a frame recording ratio, and a shooting time based on the state of the subject;

shooting a moving image at the determined shooting framerate over the determined shooting time and recording the moving image in accordance with the determined recording ratio;

receiving a shooting start instruction; and notifying a user, in response to the shooting start instruction, that a moving image is being shot, wherein in a case where the shooting time determined in the determining step is less than a threshold time, continuing a constant notification until the threshold time elapses regardless of whether or not a moving image is being shot.

15. A non-transitory computer-readable storage medium which stores a program for causing a computer to execute a control method comprising:

detecting a state of a subject;

determining a shooting framerate, a frame recording ratio, and a shooting time based on the state of the subject; and shooting a moving image at the determined shooting framerate over the determined shooting time and recording the moving image in accordance with the determined recording ratio;

receiving a shooting start instruction; and notifying a user, in response to the shooting start instruction, that a moving image is being shot, wherein in a case where the shooting time determined in the determining step is less than a threshold time, continuing a constant notification until the threshold time elapses regardless of whether or not a moving image is being shot.

16. A control method for an image capturing apparatus, the method comprising:

detecting a state of a subject;

determining a shooting framerate, a frame recording ratio, and a shooting time based on the state of the subject; and shooting a moving image at the determined shooting framerate over the determined shooting time and recording the moving image in accordance with the determined recording ratio, wherein in a case where a new moving image is shot after shooting one or more moving images, a shooting framerate, a recording ratio, and a shooting time are determined for the new moving image based on a playback time of at least one of the one or more moving images in addition to the detected state of the subject.

17. A non-transitory computer-readable storage medium which stores a program for causing a computer to execute a control method comprising:

detecting a state of a subject;

determining a shooting framerate, a frame recording ratio, and a shooting time based on the state of the subject; and shooting a moving image at the determined shooting framerate over the determined shooting time and recording the moving image in accordance with the determined recording ratio, wherein in a case where a new moving image is shot after shooting one or more moving images, a shooting framerate, a recording ratio, and a shooting time are determined for the new moving image based on a playback time of at least one of the one or more moving images in addition to the detected state of the subject.

18. A control method for an image capturing apparatus, the method comprising:

detecting a state of a subject;

determining a shooting framerate, a frame recording ratio, and a shooting time based on the state of the subject; and shooting a moving image at the deter mined shooting framerate over the determined shooting time and recording the moving image in accordance with the determined recording ratio, wherein a plurality of moving images are recorded including the one or more moving images and the new moving image as a single joined moving image, and wherein the determining comprises determining the shooting framerate, the recording ratio, and the shooting time so that a playback time of each of the plurality of the recorded moving images falls within a predetermined range.

19. A non transitory computer-readable storage medium which stores a program for causing a computer to execute a control method comprising:

detecting a state of a subject;

determining a shooting framerate, a frame recording ratio, and a shooting time based on the state of the subject; and shooting a moving image at the determined shooting framerate over the deter tined shooting time and recording the moving image in accordance with the determined recording ratio, wherein a plurality of moving images are recorded including the one or more moving images and the new moving image as a single joined moving image, and wherein the determining comprises determining the shooting framerate, the recording ratio, and the shooting time so that a playback time of each of the plurality of the recorded moving images falls within a predetermined range.

* * * * *